United States Patent
Isono et al.

(10) Patent No.: US 7,749,658 B2
(45) Date of Patent: Jul. 6, 2010

(54) METHOD FOR MANUFACTURING LIMNPO$_4$ (75) Inventors: Motoshi Isono, Susono (JP); Thierry Drezen, Cugy (CH); Ivan Exnar, Itingen (CH); Ivo Teerlinck, Zaventem (BE)

(73) Assignees: Toyota Jidosha Kabushiki Kaisha, Toyota-shi, Aichi-ken (JP); Dow Global Technologies Inc., Midland, MI (US)

( * ) Notice: Subject to any disclaimer, the term of this patent is extended or adjusted under 35 U.S.C. 154(b) by 0 days.

(21) Appl. No.: 12/084,200

(22) PCT Filed: Oct. 27, 2006

(86) PCT No.: PCT/JP2006/322037
§ 371 (c)(1), (2), (4) Date: Feb. 18, 2009

(87) PCT Pub. No.: WO2007/049815
PCT Pub. Date: May 3, 2007

(65) Prior Publication Data
US 2009/0184296 A1 Jul. 23, 2009

(30) Foreign Application Priority Data
Oct. 28, 2005 (JP) .............................. 2005-314054

(51) Int. Cl.
*H01M 4/50* (2010.01)
(52) U.S. Cl. .................. 429/224; 252/182.1; 252/521.5; 423/299; 429/218.1; 429/231.9; 429/231.95
(58) Field of Classification Search .............. 252/182.1, 252/521.5; 423/299; 429/218.1, 224, 231.9, 429/231.95
See application file for complete search history.

(56) References Cited

U.S. PATENT DOCUMENTS
2004/0175614 A1 9/2004 Wurm et al.

FOREIGN PATENT DOCUMENTS
| EP | 1 094 532 | 4/2001 |
| JP | 11-025983 | 1/1999 |
| JP | 2004-303496 | 10/2004 |

OTHER PUBLICATIONS

International Search Report.
C. Delacourt, et al., "One-Step Low-Temperature Route for the Preparation of Electrochemically Active LiMnPO$_4$ Powders," *Chem. Mater.* 2004, 16, pp. 93-99.
C. Delacourt, et al., "Low temperature preparation of optimized phosphates for Li-battery applications," *Solid State Ionics*, 173 (2004) pp. 113-118.

*Primary Examiner*—Harold Y Pyon
*Assistant Examiner*—Haidung D Nguyen
(74) *Attorney, Agent, or Firm*—Finnegan, Henderson, Farabow, Garrett & Dunner, LLP (57) ABSTRACT

The main object of the invention is to obtain LiMnPO$_4$ having an excellent crystalline and a high purity at a lower temperature. The present invention provides a method for manufacturing LiMnPO4 including the steps of: precipitating for obtaining precipitate of manganese hydroxide (Mn(OH)$_x$) by adding a precipitant to a Mn source solution in which a Mn source is dissolved; reducing for obtaining a reduced dispersion solution by dispersing the precipitate in a reducing solvent; adding for obtaining an added dispersion solution by adding a Li source solution and a P source solution to the reduced dispersion solution; pH adjusting for adjusting the pH of the added dispersion solution in the range of 3 to 6 to obtain a pH-adjusted dispersion solution; and synthesizing for synthesizing by reacting the pH-controlled dispersion solution by a heating under pressure condition.

6 Claims, 6 Drawing Sheets

METHOD FOR MANUFACTURING LIMNPO$_4$

This is a §371 application of PCT International Patent Application Number PCT/JP2006/322037, filed Oct. 27, 2006, which claimed benefit from a Japanese Patent Application Number 2005-0314054, filed Oct. 28, 2005, each of which is incorporated herein by reference in its entirety.

TECHNICAL FIELD

The invention relates to a method for manufacturing LiMnPO$_4$, which enables to obtain LiMnPO$_4$ which has an excellent crystalline and a high purity at a temperature lower than that in a conventional method.

BACKGROUND ART

With advance in the miniaturization of personal computers, video cameras and portable telephones or the like, in a field of information-related devices and communication devices, as a power source for the devices, because of high energy density, lithium secondary batteries are put into practical use and widely commercialized. On the other hand, in the field of automobiles as well, because of the environmental problems and resource problems, electric cars are urged to develop. Also as a power source of the electric cars, lithium secondary batteries are under study.

In the lithium secondary battery, as one that can obtain a 4V class operational voltage, positive electrode active materials such as LiCoO$_2$ and LiNiO$_2$ having a layered rock salt structure, LiMn$_2$O$_4$ having the spinel structure and lithium transition metal composite oxides obtained by partially substituting the above compounds with other elements are well known. Furthermore, in recent years, compounds having an olivine structure such as compounds represented by a general formula LiMPO$_4$ (M=Mn, Fe, Co, Cu, V), because of being theoretically large in the capacitance, are expected as promising materials.

For instance, in Japanese Patent Application National Publication (Laid-Open) No. 2004-529059, a method for manufacturing LiMPO$_4$ powder, which intends to obtain LiMPO$_4$ having controlled dimension and shape, is disclosed. Furthermore, in Japanese Patent Application Laid-Open (JP-A) No. 2004-303496, a method for manufacturing Li$_n$MPO$_4$ by use of inexpensive materials such as metal chlorides or the like is disclosed. Still furthermore, in WO 00/60679, a method for manufacturing a positive electrode active material characterized in mixing solid powdery raw materials, followed by sintering, and adding a reducing agent at the sintering is disclosed. Furthermore, in JP-A No. 11-25983, lithium battery active materials having an olivine structure and represented by a general formula LiM$_{1-x}$Me$_x$PO$_4$ are disclosed.

However, in all of the Japanese Patent Application National Publication (Laid-Open) No. 2004-52909, JP-A No. 2004-303496, WO 00/600679, and JP-A No. 11-25983, in order to obtain LiMPO$_4$ and so on, a sintering method that necessitates to heat up to substantially 800° C. is used. From a viewpoint of such as saving energy, a method that enables to obtain LiMnPO$_4$ which has an excellent crystalline and a high purity at temperatures lower than that in a conventional method is in demand.

DISCLOSURE OF THE INVENTION

Problems to be Solved by the Invention

The invention mainly intends to obtain LiMnPO$_4$ which has an excellent crystalline and a high purity at a temperature lower than a temperature in a conventional sintering method.

Means for Solving the Problems

In order to achieve the above object, in the invention, a method for manufacturing LiMnPO$_4$ characterized by comprising the steps of: precipitating for obtaining precipitate of manganese hydroxide (Mn(OH)$_x$) by adding a precipitant to a Mn source solution in which a Mn source is dissolved; reducing for obtaining a reduced dispersion solution by dispersing the precipitate in a reducing solvent; adding for obtaining an added dispersion solution by adding a Li source solution and a P source solution to the reduced dispersion solution; pH adjusting for adjusting the pH of the added dispersion solution in the range of 3 to 6 to obtain a pH-adjusted dispersion solution; and synthesizing for synthesizing by reacting the pH-adjusted dispersion solution by a heating under pressure condition is provided.

According to the invention, by undergoing the above steps, LiMnPO$_4$ having an excellent crystalline and a high purity can be obtained. Furthermore, in the above synthesis process, when for instance an autoclave or the like is used to carry out the hydrothermal synthesis, LiMnPO$_4$ can be obtained at a temperature lower than a temperature in a conventional sintering method, thereby preferably resulting in cutting energy.

In the invention, the reducing solvent is preferably a hydrogen peroxide solution, or a primary alcohol or a secondary alcohol. This is because LiMnPO$_4$ which has an excellent crystalline and a high purity can be obtained.

In the invention, a method for manufacturing a positive electrode active material characterized in that LiMnPO$_4$ obtained according to the method for manufacturing LiMnPO$_4$ and a conductive agent are blended is provided.

According to the invention, by blending a conductive agent with LiMnPO$_4$, an advantage that a positive electrode active material excellent in the electrical conductivity can be obtained can be achieved.

Effects of the Invention

In the invention, an advantage that LiMnPO$_4$ having an excellent crystalline and a high purity can be obtained at a temperature lower than a temperature in a conventional sintering method can be obtained.

BEST MODE FOR CARRYING OUT THE INVENTION

Hereinafter, a method for manufacturing $LiMnPO_4$ according to the invention and a method for manufacturing a positive electrode active material will be detailed.

A. Method for Manufacturing $LiMnPO_4$

Figure 1:
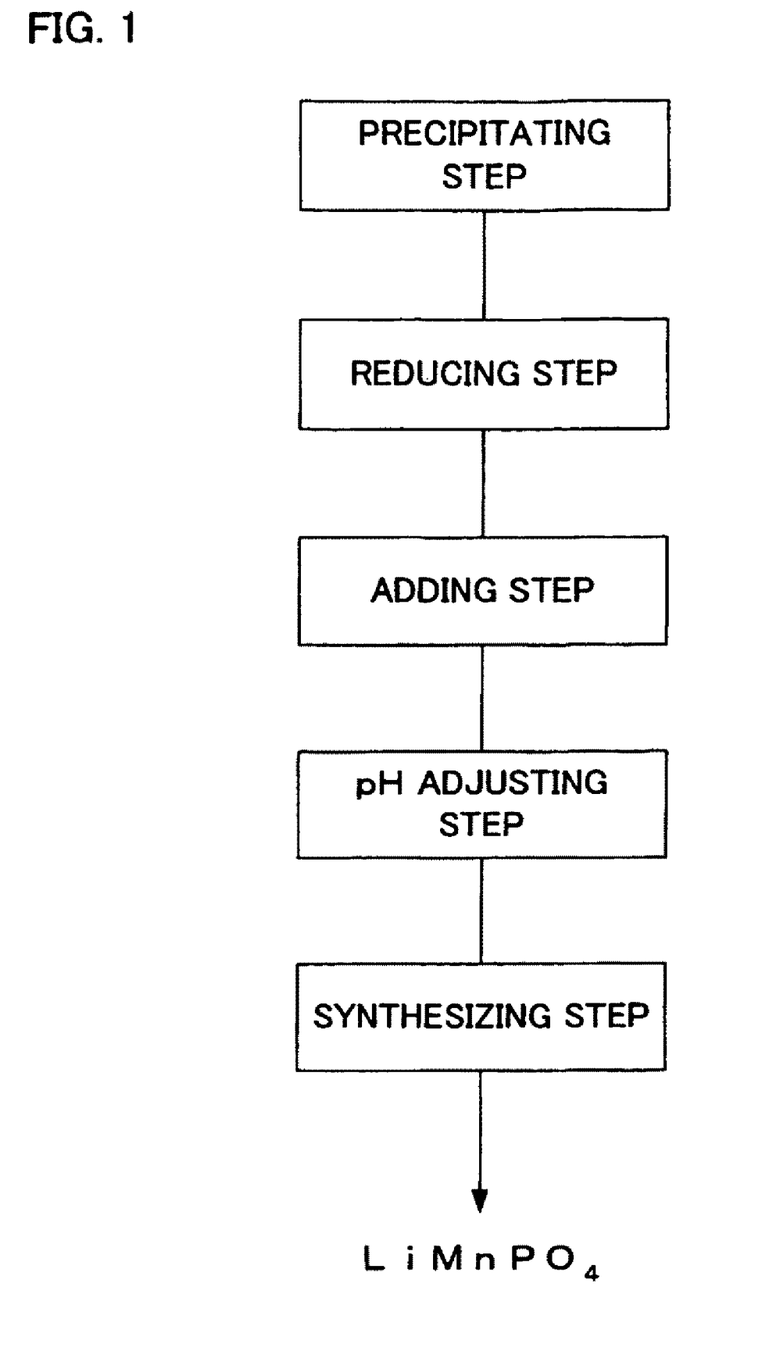
FIG. 1 is a flow chart showing a method for manufacturing LiMnPO$_4$ according to the invention.

Firstly, a method for manufacturing $LiMnPO_4$ according to the invention will be described. The method for manufacturing $LiMnPO_4$ according to the invention, as shown in FIG. 1, is a method of obtaining $LiMnPO_4$ by carrying out the steps of precipitating, reducing, adding, pH adjusting and synthesizing.

Hereinafter, the respective steps in the invention will be detailed.

1. Precipitating Step

Firstly, the precipitating step in the invention will be described. The precipitating step in the invention is a step to obtain manganese hydroxide $Mn(OH)_x$ by adding a precipitant in a Mn source solution in which a Mn source is dissolved.

A Mn source solution used in the step is obtained by dissolving a Mn source in a solvent.

The Mn source, as far as it contains Mn and reacts with a precipitant described later to form manganese hydroxide, is not particularly restricted. For instance, manganese acetate tetrahydrate $(C_4H_6O_4Mn.4H_2O)$ and manganese chloride tetrahydrate $(MnCl_2.4H_2O)$ can be cited. Furthermore, in the invention, as the Mn source, compounds represented by such as $Mn(OOCR)_2$ (R represents $—CH_2OH$ or $—CH_2CH_2OH$) can be used.

Furthermore, as a solvent that can be used in the Mn source solution, as far as it can dissolve the Mn source, there is no particular restriction. For instance, water and alcohols can be cited, and water being particularly preferably used. As a concentration of the Mn source solution, though different depending on the kind of the Mn source and solvent, it is for instance in the range of 0.1 to 0.4 mol/l, particularly preferably in the range of 0.1 to 0.3 mol/l. This is because, in both cases when the concentration is excessively high or excessively low, desired manganese hydroxide may not be obtained.

Still furthermore, as the precipitant, as far as it reacts with the Mn source to obtain manganese hydroxide, there is no particular restriction. For instance, lithium hydroxide monohydrate $(LiOH.H_2O)$ and so on can be cited. Furthermore, the precipitant may be added directly to the Mn source solution or a solution obtained by dissolving the precipitant in a solvent such as water may be added to the Mn source solution.

In the present step, precipitate of manganese hydroxide $Mn(OH)_x$ is obtained by adding the precipitant to the Mn source solution. The precipitate is filtered, washed with water and or the like to be used in the reducing step. Manganese hydroxide precipitate obtained in the step is in some cases in slurry state.

2. Reducing Step

Next, a reducing step in the invention will be described. The reducing step in the invention is a step to obtain a reduced dispersion solution by dispersing the precipitate of manganese hydroxide $Mn(OH)_x$ obtained in the precipitating step in a reducing solvent. According to the step, manganese hydroxide $Mn(OH)_x$ is considered converted to divalent manganese hydroxide $Mn(OH)_2$.

A reducing solvent used in the step, as far as it is reducing and can convert manganese hydroxide $Mn(OH)_x$ to divalent manganese hydroxide $Mn(OH)_2$, is not particularly restricted. For instance, hydrogen peroxide solution, primary alcohol, secondary alcohol, hydroquinone, and sugar can be cited. Among these, hydrogen peroxide solution, primary alcohol and secondary alcohol are preferable. As the primary alcohol, for instance, 1-butanol and 1-propanol or the like can be cited. As the secondary alcohol, for instance, 2-propanol or the like can be cited.

Furthermore, when in particular a substance high in the reactivity such as hydrogen peroxide solution is used as a reducing solvent, the precipitate of the manganese hydroxide $Mn(OH)_x$ is dissolved in water in advance, followed by preferably adding the reducing solvent to the dispersion solution. In this case, the reducing solvent is preferably added gradually to the dispersion solution.

3. Adding Step

Then, an adding step in the invention will be described. The adding step in the invention is a step of obtaining an added dispersion solution by adding a Li source solution and P (phosphorus) source solution to the reduced dispersion solution obtained in the reducing step. Owing to the step, all materials constituting $LiMnPO_4$ are contained in the dispersion solution.

The Li source solution used in the step is obtained by dissolving a Li source in a solvent.

As the Li source, as far as it contains Li and can obtain $LiMnPO_4$ through a synthesizing step described later, there is no particular restriction. For instance, lithium hydroxide monohydrate $(LiOH.H_2O)$ or the like can be cited.

Furthermore, the solvent that is used in the Li source solution, as far as it can dissolve the Li source, is not particularly restricted. For instance, water and alcohols or the like can be cited, and water being particularly desirable.

On the other hand, the P (phosphorus) source solution used in the step is obtained by dissolving a P (phosphorus) source in a solvent.

The P source, as far as it contains P and can obtain $LiMnPO_4$ through a synthesizing step described later, is not particularly restricted. For instance, ammonium dihydrogen phosphate $(H_6NO_4P)$ and phosphorus pentoxide $(P_2O_5)$ or the like can be cited.

Furthermore, as the solvent that is used in the P source solution, as far as it can dissolve the P source, there is no particular restriction. For instance, water and alcohols or the like can be cited, and water being particularly preferable.

Ratios of the Mn source, the Li source and the P source that are used in the invention, as far as a desired $LiMnPO_4$ can be obtained, are not particularly restricted. However, it is preferably in the range of Mn source: Li source: P source=1:1 to 1.5:1 by mole ratio. That is, Li is preferably in the range of equimolar amount or a little excess.

4. PH Adjusting Step

Next, the pH adjusting step in the invention will be described. The pH adjusting step in the invention is a step of obtaining a pH adjusted dispersion solution by adjusting the pH of the added dispersion solution obtained in the adding step to the range of 3 to 6. The pH of the added dispersion solvent obtained in the adding step is normally 7 or more. Accordingly, in the step, an acid is added to adjust the pH.

The acid that is used in the pH adjusting step, as far as the pH of the added dispersion solution can be adjusted in the above range, is not particularly restricted. For instance, acetic acid, hydrochloric acid, formic acid, sulfuric acid, and phosphoric acid or the like can be cited.

5. Synthesizing Step

Next, the synthesizing step in the invention will be described. The synthesizing step in the step is a step in which the pH adjusted dispersion solution obtained from the pH adjusting step is allowed to react by a heating under pressure condition. Owing to the step, precipitate of $LiMnPO_4$ can be obtained.

A heating temperature in the step, though varying depending on a composition of the pH adjusted dispersion solution, namely, kinds or the like of the Mn source, Li source, P source and solvent, and furthermore depending on a pressurizing pressure described later, is, for instance, in the range of 120 to 250° C. and preferably in the range of 150 to 200° C.

Furthermore, the pressure in the step, though varying depending on the composition or the like of the pH adjusted dispersion solution and furthermore on the heating temperature, is in the range of 5 to 10 atm and preferably in the range of 6 to 9 atm.

A method of carrying out the step, as far as it can realize the above heating under pressure condition and can obtain desired $LiMnPO_4$, is not particularly restricted. Specifically, a hydrothermal synthesis with an autoclave can be cited. Furthermore, as the autoclave, there is no particular restriction; that is, commercially available one can be used.

6. Others

Owing to the above synthesizing step, precipitate of $LiMnPO_4$ is obtained, followed by filtering, washing and drying, and thereby $LiMnPO_4$ powder is obtained. Furthermore, the crystallinity of $LiMnPO_4$ obtained in the invention can be judged by measuring an X-ray diffraction pattern. Applications of $LiMnPO_4$ obtained according to the invention are not particularly restricted. For instance, it can be used as a positive electrode active material of lithium secondary batteries.

B. Method for Manufacturing f Positive Electrode Active Material

Next, a method for manufacturing a positive electrode active material according to the invention will be described. The method for manufacturing the positive electrode active material according to the invention is characterized in blending $LiMnPO_4$ obtained according to the method for manufacturing the $LiMnPO_4$ and a conductive agent.

$LiMnPO_4$ used in the invention, being obtained according to a manufacturing method described in the "A. Method for manufacturing $LiMnPO_4$", is omitted from describing here.

Furthermore, the conductive agent used in the invention, as far as it can improve the electrical conductivity, is not particularly restricted. For instance, graphite or carbon black such as acetylene black can be cited.

The conductive agent is added in the range of 5 to 25 parts by weight, preferably in the range of 10 to 20 parts by weight to 100 parts by weight of $LiMnPO_4$. When an amount of the conductive agent is less than necessary, the electrical conductivity may not be sufficiently improved, and, when it is more than necessary, since an amount of $LiMnPO_4$ becomes relatively less, the performance as the positive electrode active material may be deteriorated.

In the invention, a method of blending the $LiMnPO_4$ and the conductive agent is not particularly restricted. However, for instance, the physical blending is preferable and the mechanical blending is particularly preferable. Specifically, a ball mill pulverizing method or the like can be cited. Furthermore, applications of the positive electrode active material obtained according to the invention are not particularly restricted. However, it can be used in, for instance, lithium secondary batteries.

The invention is not restricted to the above embodiments. The embodiments are only exemplifications. All that have configurations and advantages substantially same as that of technical ideas described in claims according to the invention are included in the technical ranges of the invention.

EXAMPLES

Hereinafter, the invention will be more specifically described with reference to examples.

Example 1

A Mn source solution was obtained by dissolving 0.02 mol of manganese acetate tetrahydrate ($C_4H_6O_4Mn.(4H_2O)_4$) in 100 ml of deionized water. Next, a precipitant was obtained by dissolving 0.04 mol of lithium hydroxide monohydrate ($LiOH.H_2O$) in 100 ml of deionized water. When the solutions were blended, precipitate in slurry state of manganese hydroxide ($Mn(OH)_x$) was obtained.

Next, the obtained precipitate was filtered and washed with deionized water. Thereafter, the precipitate was transferred in a 1 L beaker, 100 ml of deionized water was added, 10 ml of 15% hydrogen peroxide solution was gradually dropped, followed by agitating for 3 minutes, and thereby a reduced dispersion solution was obtained.

Then, 0.02 mol of ammonium dihydrogen phosphate ($H_6NO_4P$) was dissolved in 100 ml of deionized water and thereby a P source solution was obtained. Furthermore, 0.03 mol of lithium hydroxide monohydrate ($LiOH.H_2O$) was dissolved in 100 ml of deionized water and thereby a Li source solution was obtained. The solutions were simultaneously added to the reduced dispersion solution mentioned above, followed by agitating for 5 minutes, and thereby an added dispersion solution was obtained. The pH of the added dispersion solution was 9.5.

Next, to the added dispersion solution, 10 ml of 15% hydrogen peroxide solution and 2 ml of acetic acid were gradually dropped, and thereby a pH-adjusted dispersion solution was obtained. The pH of the pH-adjusted dispersion solution was 5.3.

Next, the pH-adjusted dispersion solution was transferred in a Teflon coated autoclave and allowed reacting at a temperature in the range of 150 to 200° C. for two days. Thereafter, the dispersion solution was cooled and filtered, obtained light brown precipitate was washed with deionized water, followed by drying in air at 60° C. overnight, and thereby $LiMnPO_4$ was obtained.

Then, an X-ray diffraction pattern of the obtained $LiMnPO_4$ was measured. Measurement conditions are as follows.

Equipment: Siemens-Lristalloflex 805

X-ray: CuKα, 40 kV, 35 mA

Scanning range: 2θ=0 to 70°

Figure 2:
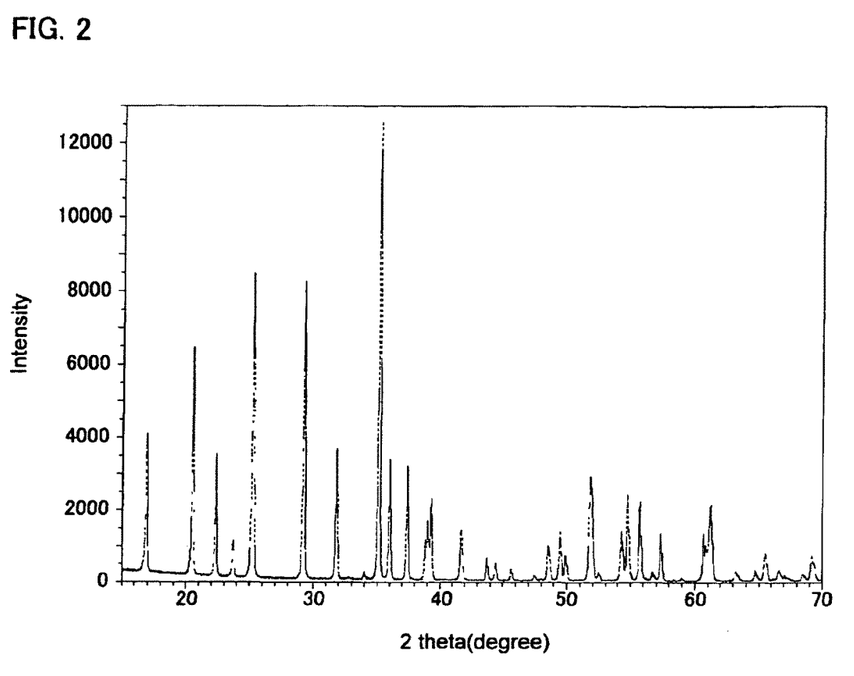
FIG. 2 is an X-ray diffraction pattern of LiMnPO$_4$ obtained in an example 1.

An X-ray diffraction pattern obtained in the above measurement is shown in FIG. 2. Furthermore, unit lattice parameters of the obtained $LiMnPO_4$ were as follows, that is, a =

10.4539 (6) Å, b=6.1026 (4) Å, and c=4.7469 (3) Å. From the results, LiMnPO$_4$ was confirmed to have an excellent crystalline.

Figure 3A:
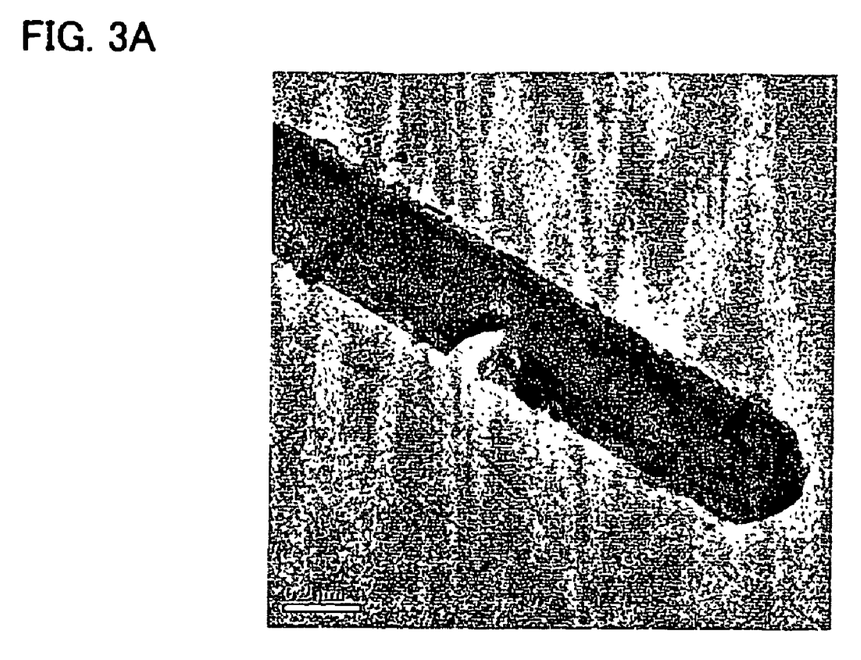
FIGS. 3A and 3B are TEM photographs of LiMnPO$_4$ obtained in an example 1.
Figure 3B:
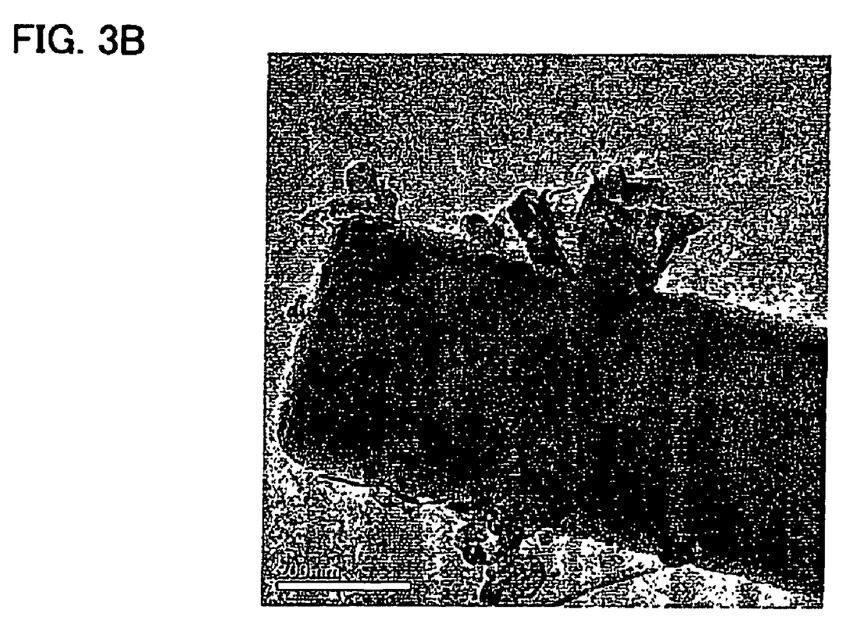

Furthermore, the obtained LiMnPO$_4$ was observed with a transmission electron microscope (TEM). TEM photographs thereof are shown in FIGS. 3A and 3B.

Example 2

LiMnPO$_4$ obtained according to the example 1 was transferred in a 250 ml zirconium oxide container, followed by ball-mill pulverizing for 1 hour with 20 zirconium balls having a diameter of 10 mm. Thereafter, carbon black was added, followed by further pulverizing with a ball mill for 3 hours, and thereby a positive electrode active material having a composition of LiMnPO$_4$/C was obtained.

Figure 4A:
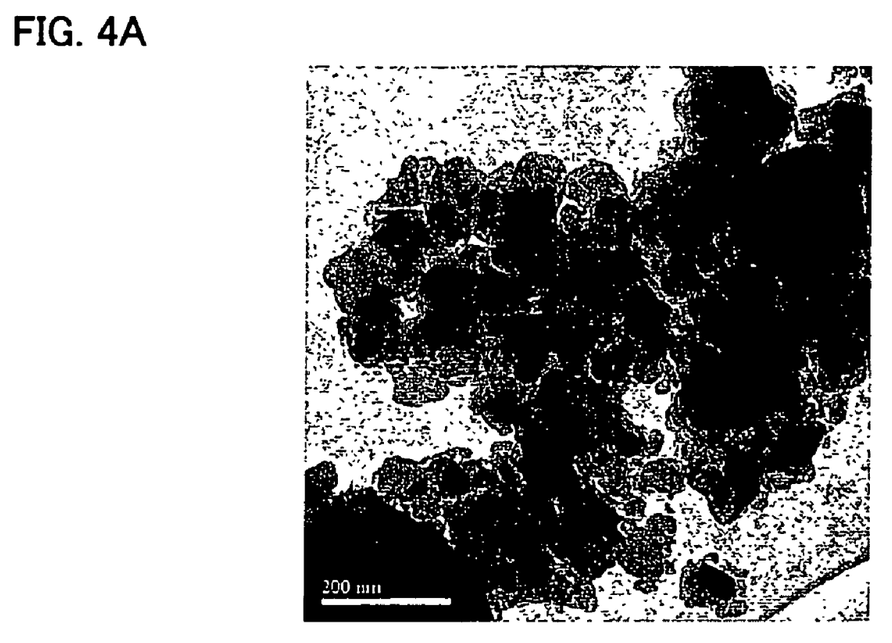
FIGS. 4A and 4B are TEM photographs of a positive electrode active material obtained in an example 2.
Figure 4B:
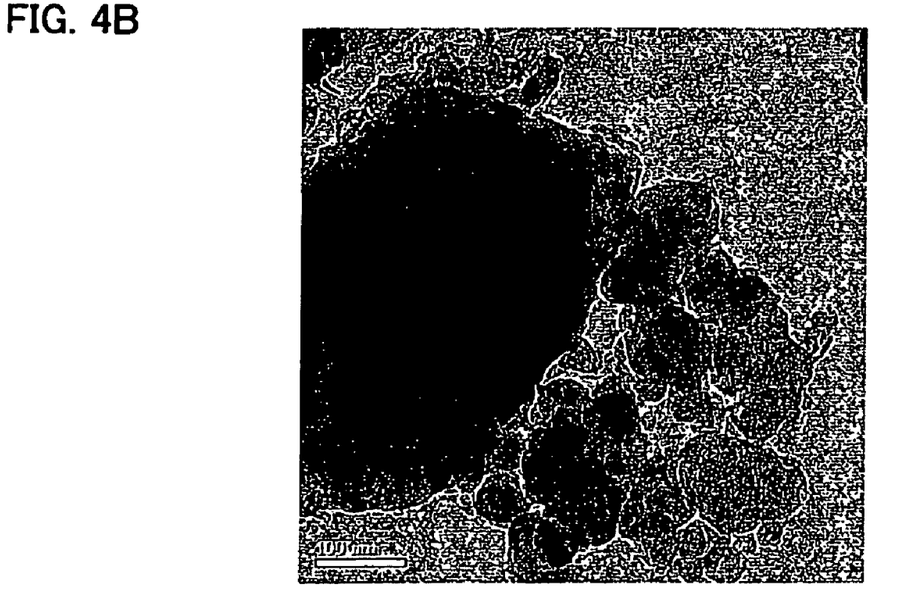

TEM photographs of the obtained positive electrode active material are shown in FIGS. 4A and 4B.

Example 3

The positive electrode active material obtained according to the example 2, carbon black (trade name: C55, manufactured by Shawiniga Corp) and a binder (polyvinylidene difluoride, PVDF) were dissolved in N-methyl-2-pyrolydinone at a mass ratio of 90:5:5, and thereby a positive electrode composition was obtained. The positive electrode composition was coated on an aluminum foil that is a current collector, followed by drying in air at 100° C. for 1 hour, further followed by heating at 120° C. for 30 minutes with a hot plate, and thereby N-methyl-2-pyrolydinone was evaporated. Furthermore, by drying overnight at 160° C. under a reduced pressure, a positive electrode was obtained.

Example 4

By use of the positive electrode obtained according to the example 3, with a Li metal ,as a negative electrode and Microporous Celgard membrane (manufactured by Celgard Inc.) as a separator, a lithium secondary battery was prepared. As an electrolyte, one obtained by adding 1 M of LiPF$_6$ to a mixed solution in which ethylene carbonate (EC) and dimethyl carbonate (DMC) were blended at a ratio of 1:1 was used.

Figure 5:
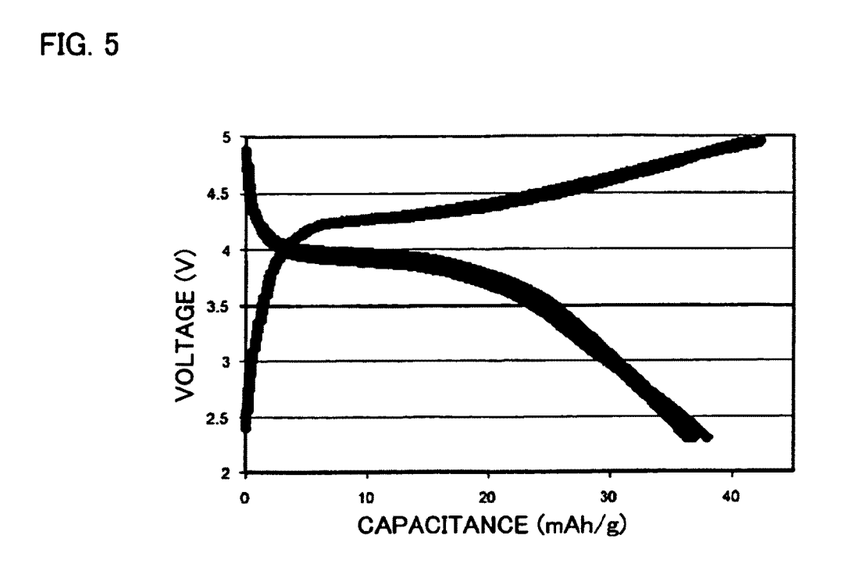
FIG. 5 is a characteristic diagram showing charge/discharge characteristics of a lithium secondary battery obtained in an example 4.

The lithium secondary battery was charged at a current density of 0.03 mA/cm$^2$ until a terminal voltage of 4.7V was obtained. Thereafter, at a current density of 0.03 mA/cm$^2$$_1$ discharge was carried out until a terminal voltage of 2.3 V was obtained. The charge/discharge cycle was repeated for three times. Results are shown in FIG. 5.

Example 5

A Mn source solution was obtained by dissolving 0.02 mol of manganese acetate tetrahydrate (C$_4$H$_6$O$_4$Mn.(4H$_2$O)$_4$) in 100 ml of deionized water. Next, a precipitant was obtained by dissolving 0.04 mol of lithium hydroxide monohydrate (LiOH.H$_2$O) in 100 ml of deionized water. When the solutions were blended, precipitate in slurry state of manganese hydroxide (Mn(OH)$_x$) was obtained.

Next, the obtained precipitate was filtered and washed with deionized water. Thereafter, the precipitate was transferred in a 1 L beaker, 100 ml of 1-butanol was added, followed by agitating for 3 minutes, and thereby a reduced dispersion solution was obtained.

Then, 0.02 mol of ammonium dihydrogen phosphate (H$_6$NO$_4$P) was dissolved in 100 ml of deionized water and thereby a P source solution was obtained. Furthermore, 0.03 mol of lithium hydroxide monohydrate (LiOH.H$_2$O) was dissolved in 100 ml of deionized water and thereby a Li source solution was obtained. The solutions were simultaneously added into the reduced dispersion solution mentioned above, followed by agitating for 5 minutes, and thereby an added dispersion solution was obtained. The pH of the added dispersion solution was 9.5.

Next, to the added dispersion solution, 2 ml of acetic acid was gradually dropped, and thereby a pH-adjusted dispersion solution was obtained. The pH of the pH-adjusted dispersion solution was 5.2.

Figure 6:
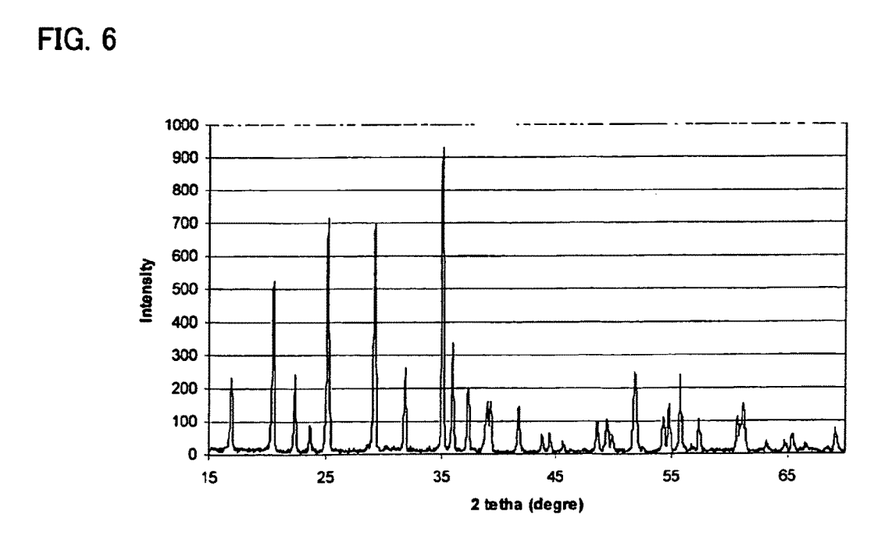
FIG. 6 is an X-ray diffraction pattern of $LiMnPO_4$ obtained in an example 5.

Next, the pH-adjusted dispersion solution was transferred to a Teflon coated autoclave and allowed reacting at a temperature of 170° C. for two days. Thereafter, the dispersion solution was cooled and filtered, obtained light brown precipitate was washed with deionized water, followed by drying in air at 60° C. overnight, and thereby LiMnPO$_4$ was obtained. An X-ray diffraction pattern of the obtained LiMnPO$_4$ was measured. The measurement conditions were same as those of the example 1. An X-ray diffraction pattern obtained by the measurement is shown in FIG. 6. Furthermore, the unit lattice parameters of the obtained LiMnPO$_4$ were same as that of the example 1. From the results, it is confirmed that LiMnPO$_4$ has an excellent crystalline.

Example 6

Except that when obtaining the reduced dispersion solution, in place of adding 100 ml of 1-butanol, 100 ml of 1-propanol was added, similarly to the example 5, LiMnPO$_4$ was obtained. The pH of the added dispersion solution was 9.5 and the pH of the pH-adjusted dispersion solution was 5.0.

Figure 7:
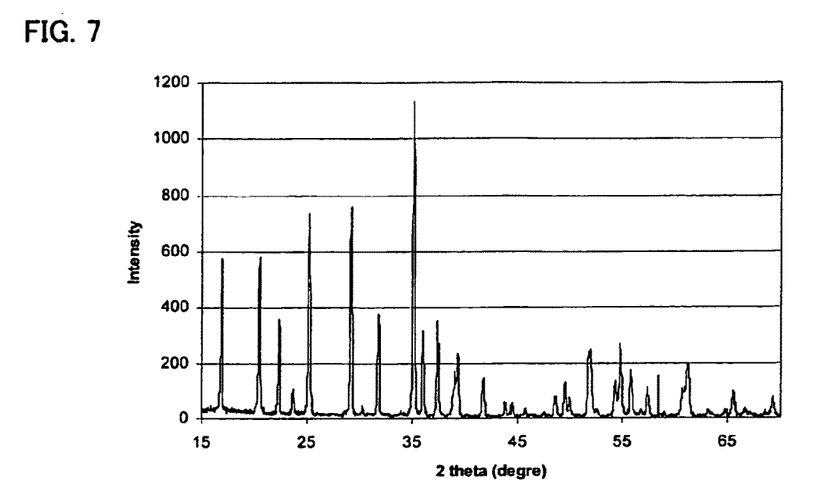
FIG. 7 is an X-ray diffraction pattern of $LiMnPO_4$ obtained in an example 6.

Next, an X-ray diffraction pattern of the obtained LiMnPO$_4$ was measured. The measurement conditions were same as those of the example 1. An X-ray diffraction pattern obtained by the measurement is shown in FIG. 7. Furthermore, the unit lattice parameters of the obtained LiMnPO$_4$ were same as that of the example 1. From the results, it is confirmed that LiMnPO$_4$ has an excellent crystalline.

Example 7

Except that when obtaining the reduced dispersion solution, in place of adding 100 ml of 1-butanol, 50 ml of 2-propanol was added, similarly to the example 5, LiMnPO$_4$ was obtained. The pH of the added dispersion solution was 9.5 and the pH of the pH adjusted dispersion solution was 5.3.

Figure 8:
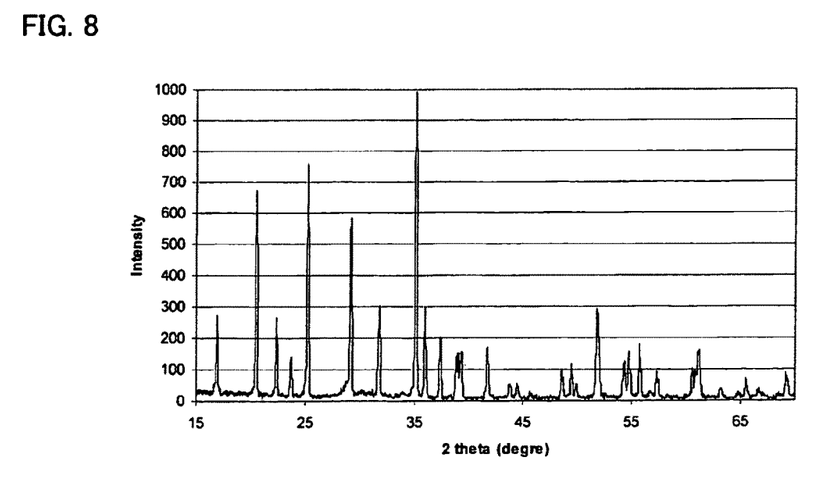
FIG. 8 is an X-ray diffraction pattern of $LiMnPO_4$ obtained in an example 7.

Next, an X-ray diffraction pattern of the obtained LiMnPO$_4$ was measured. The measurement conditions were same as those of the example 1. An X-ray diffraction pattern obtained by the measurement is shown in FIG. 8. Furthermore, the unit lattice parameters of the obtained LiMnPO$_4$ were same as that of the example 1. From the results, it is confirmed that LiMnPO$_4$ has an excellent crystalline.

The invention claimed is:

1. A method for manufacturing LiMnPO$_4$ comprising the steps of:
   precipitating for obtaining a precipitate of a manganese hydroxide (Mn(OH)$_x$) by adding a precipitant to a Mn source solution in which a Mn source is dissolved;
   reducing for obtaining a reduced dispersion solution by dispersing the precipitate in a reducing solvent;
   adding for obtaining an added dispersion solution by adding a Li source solution and a P source solution to the reduced dispersion solution;

pH adjusting for adjusting a pH of the added dispersion solution in a range of 3 to 6 to obtain a pH-adjusted dispersion solution; and synthesizing for synthesizing by reacting the pH-adjusted dispersion solution by a heating under pressure condition.

2. The method for manufacturing $LiMnPO_4$ according to claim 1, wherein the reducing solvent is a hydrogen peroxide solution.

3. The method for manufacturing $LiMnPO_4$ according to claim 1, wherein the reducing solvent is a primary alcohol or a secondary alcohol.

4. A method for manufacturing a positive electrode active material, comprising the steps of:

precipitating for obtaining a precipitate of a manganese hydroxide ($Mn(OH)_x$) by adding a precipitant to a Mn source solution in which a Mn source is dissolved;

reducing for obtaining a reduced dispersion solution by dispersing the precipitate in a reducing solvent;

adding for obtaining an added dispersion solution by adding a Li source solution and a P source solution to the reduced dispersion solution;

pH adjusting for adjusting a pH of the added dispersion solution in a range of 3 to 6 to obtain a pH-adjusted dispersion solution;

synthesizing for synthesizing by reacting the pH-adjusted dispersion solution by a heating under pressure condition; and blending for blending $LiMnPO_4$ obtained by the synthesizing step and a conductive agent.

5. The method for manufacturing a positive electrode active material according to claim 4, wherein the reducing solvent is a hydrogen peroxide solution.

6. The method for manufacturing a positive electrode active material according to claim 4, wherein the reducing solvent is a primary alcohol or a secondary alcohol.

* * * * *